United States Patent [19]

Kumar et al.

[11] Patent Number: 5,079,202
[45] Date of Patent: Jan. 7, 1992

[54] CATALYTIC CRACKING CATALYSTS

[75] Inventors: Ranjit Kumar, Columbia; Alan W. Peters, Ashton, both of Md.

[73] Assignee: W. R. Grace & Co.-Conn., New York, N.Y.

[21] Appl. No.: 658,738

[22] Filed: Feb. 21, 1991

[51] Int. Cl.$^5$ .......................... B01J 21/16; B01J 29/04
[52] U.S. Cl. .......................... 502/68; 502/64; 502/243
[58] Field of Search .................. 502/64, 68, 243; 423/179; 208/120, 118

[56] References Cited

U.S. PATENT DOCUMENTS

| | | | |
|---|---|---|---|
| 3,527,694 | 9/1970 | Luckenbach | 208/118 |
| 3,647,682 | 3/1972 | Rabo et al. | 208/120 |
| 4,311,581 | 1/1982 | Baron et al. | 208/118 |
| 4,430,200 | 2/1984 | Shihabi | 208/120 |
| 4,597,955 | 7/1986 | Mein | 423/179 |
| 4,668,655 | 5/1987 | Lewis et al. | 502/304 |

FOREIGN PATENT DOCUMENTS 103678   4/1938   Australia ............... 208/120

*Primary Examiner*—Carl F. Dees
*Attorney, Agent, or Firm*—Arthur P. Savage

[57] ABSTRACT

Catalytic cracking catalysts which comprise molecular sieves/zeolites dispersed in an inorganic oxide matrix that includes pollucite.

9 Claims, No Drawings

CATALYTIC CRACKING CATALYSTS

The present invention relates to inorganic catalytic cracking catalyst compositions, and more specifically, to cesium containing cracking catalysts which are particularly effective for minimizing the production of by-product hydrogen and coke.

Catalysts which contain zeolites dispersed in an inorganic oxide matrix are widely used in the catalytic cracking of high molecular weight hydrocarbons.

Commercially available catalysts typically comprise a synthetic faujasite such as zeolite Y in combination with an inorganic oxide matrix that includes clay and silica, alumina, or silica-alumina sol or gel binder.

During use in commercial fluid catalytic cracking (FCC) operations, the catalyst matrix inherently produces low value products such as hydrogen and coke at the expense of valuable products such as gasoline and cycle oils. Furthermore, it is observed that the catalysts undergo progressive deactivation due to thermal decomposition and metals (V+Ni) contamination.

U.S. Pat. No. 4,430,200 describes catalytic cracking catalysts which contain presteamed zeolites that are exchanged with alkali metal ions such as sodium, potassium and cesium. The catalysts exhibit reduced activity, aging rates and lower gas yield properties.

U.S. Pat. No. 3,647,682 describes FCC catalysts which contain molecular sieves such as type Y-zeolites that are fully cationized with monovalent ions such as cesium. The catalysts are selective for the production of olefins from saturated hydrocarbon feedstocks.

U.S. Pat. No. 4,668,655 discloses FCC catalysts which include an SOx emission control additive that comprises bismuth, chromium or rare earth metal and an alkali metal such as potassium, sodium or cesium on a refractory support.

While the prior art discloses FCC catalysts which contain cesium, these catalysts have not been used extensively on a commercial scale.

It is therefore an object of the present invention to provide improved cesium containing FCC catalysts that have a particularly high degree of activity.

It is a further object to provide highly active cesium containing FCC catalysts at reasonable cost.

These and still further objects will become readily apparent to one skilled in the art from the following description and detailed specific examples.

Broadly, our invention contemplates FCC catalysts which comprise a molecular sieve/zeolite component and an inorganic oxide matrix which contains pollucite.

More specifically, we have found that the activity characteristics of molecular sieve/zeolite containing FCC catalyst may be improved by the addition of about 1 to 50 weight percent of discrete particles of pollucite having the mole formula: (0.05 to 1 $Cs_2O$)(1.90/n to 0 $M^nO_{n/2}$).$Al_2O_3$.4 $SiO_2$ wherein M represents H$^+$ and metal cations, n represents the valence charge on metal cations, and wherein the combined $Na_2O$ and $Li_2O$ mole content is less then about 0.5.

Catalyst compositions of our invention preferably comprise:
(a) from about 5 to 70 wt. % molecular sieve/zeolite;
(b) from about 5 to 90 wt. % inorganic oxide matrix;
(c) from about 1 to 50 wt. % pollucite; and
(d) less than about 0.01 to 1.0 wt. % $Na_2O$.

The molecular sieve/zeolite component may comprise synthetic faujasite (type Y zeolite), ZSM-5 zeolite such as ZSM-5, 20, zeolite Beta, mordenite, SAPO, ALPO, and mixtures thereof. The zeolite/molecular sieve component may be cation exchanged and/or thermally and chemically treated as disclosed in U.S. Pat. No. 3,293,192, U.S. Pat. No. 3,449,070, U.S. Pat. No. 3,518,051, RE 28,629, U.S. Pat. No. 3,607,043 and U.S. Pat. No. 3,676,368. Particularly preferred zeolite components include ultrastable Y zeolite (USY) and rare-earth calcined type Y zeolite (CREY).

The matrix component of our catalysts comprise silica, alumina, silica-alumina, phosphorus-alumina sols and gels and binders, preferably in combination with clay such as kaolin, and pollucite.

The preparation of our catalysts includes the addition of finely divided cesium additive to an aqueous slurry of the zeolite/molecular sieve component and inorganic oxide sol, gel or hydrogel binder and spray drying the mixture to obtain fluidizable catalyst particles having a size range of about 20 to 150 micro meters wherein the zeolite/molecular sieve and cesium additive are uniformly dispersed throughout the matrix.

Procedures for preparing catalysts to which pollucite is added are disclosed in U.S. Pat. No. 3,957,689, Canadian 967,136, U.S. Pat. No. 4,499,197, U.S. Pat. No. 4,542,118 and U.S. Pat. No. 4,458,023.

In a particularly preferred practice of our invention, an aqueous slurry which contains 2 to 20 weight percent pollucite, 20 to 60 wt. % kaolin, 10 to 60 wt. % USY zeolite containing 0.2 to 1.0 wt. % $Na_2O$ having a unit cell 24.40 to 24.60 Å and 10 to 30 wt. % aluminum chlorhydroxy polymer, such as Chlorhydrol, is spray dried and then calcined at a temperature of 500° C. to 700° C. The resulting catalysts have a particle size range of 20 to 150 micro meters, an attrition index of 0 to 30 DI (as determined by the Davison Index method described below), an activity of 50 MA to 85 MA (as measured by ASTM Procedure D-3907-8), and a $Na_2O$ content of 0.01 to 1.0 wt. %.

The Davison Index (DI) is determined as follows:

A 7.0 g sample of catalyst is screened to remove particles in the 0 to 20 micron size range. The particles above 20 microns are then subjected to a 1 hour test in a standard Roller Particle Size Analyzer using a hardened steel jet cup having a precision bored orifice. An air flow of 21 liters a minute is used. The Davison Index is calculated as follows:

$$\text{Davison Index} = \frac{\text{wt. \% 0-20 micron material formed during test}}{\text{wt. original 20 + micron fraction}}$$

Preferred cesium containing additives used in the practice of the invention includes both naturally occurring and synthetic which typically have the mole composition (0.05 to 1 $Cs_2O$).(1.90/n to 0 $M^nO_{n/2}$).$Al_2O_3$.4 $SiO_2$ wherein M represents H$^+$, represents the valence charge on metal cations, and wherein the combined $Na_2O$ and $Li_2O$ mole content is below about 0.5.

The FCC catalyst of our invention may be used to crack hydrocarbon feedstocks such as gas-oil, resid and mixtures thereof at reaction temperatures of 500° C. to 600° C. and regeneration temperatures of 600° C. to 850° C. to obtain yields of cracked products.

Having described the basic aspects of our invention, the following Examples are set forth to illustrate particular embodiments:

EXAMPLE I

Catalyst Preparation

A series of catalyst compositions were prepared by combining pollucite obtained from Carus Chemical Company, Illinois, U.S.A., having the composition set forth in Table A, and having an estimated milled particle size of about 0.1 to 10 μm with kaolin, aluminum chlorhydroxide polymer having the formula $Al_2(OH)_5Cl \cdot (2.5\ H_2O)$, USY zeolite having a $Na_2O$ content of <1 wt. % and unit cell of 24.58 Å and water to obtain an aqueous slurry having an estimated solids content of 25 wt. %. The slurry was spray dried to obtain microspheroidal particles having a size range of 20 to 150 μm, which were calcined at 538° C. for 2 hours. The composition of the catalyst samples and physical properties are summarized in Table B.

TABLE A

| Element | Wt. % |
|---|---|
| Li | .16 |
| Na | 1.27 |
| K | .03 |
| Rb | .58 |
| Cs | 25.16 |
| Mg | .023 |
| Ca | .015 |
| Sr | <.013 |
| Ba | <.022 |
| Al | 9.63 |
| Fe | .13 |
| Cr | .009 |
| Mn | .03 |
| Si | 21.6 |
| $SO_4$ | .91 |

TABLE B

| Sample | | A | B | C | D | E |
|---|---|---|---|---|---|---|
| Pollucite | (wt. %) | 0 | 4 | 8 | 12 | 16 |
| Kaolin | (wt. %) | 50 | 46 | 42 | 38 | 34 |
| chlorhydroxide polymer | (wt. %) | 15 | 15 | 15 | 15 | 15 |
| USY | (wt. %) | 35 | 35 | 35 | 35 | 35 |

EXAMPLE II

Catalyst Evaluation

The catalyst samples of Example I were evaluated for the cracking of hydrocarbons as follows.

Samples were treated for 4 hours at 815° C. in 100% steam in a fluidized bed reacted at atmospheric pressure. They were then tested for microactivity, below.

The results of the evaluation are summarized in Table C.

TABLE C

| Sample | A | B | C | D | E |
|---|---|---|---|---|---|
| MA* | 58.6 | 63.8 | 67.2 | 68.1 | 68.8 |
| $H_2$ (wt. %) | 0.086 | 0.067 | 0.060 | 0.059 | 0.057 |
| Coke (wt. %) | 2.3 | 2.3 | 2.9 | 3.1 | 3.0 |

*Microactivity as determined by ASTM method #D3907-8

We claim:

1. A cracking catalyst composition which comprises a molecular sieve/zeolite dispersed in an inorganic oxide matrix which contains pollucite.

2. The composition of claim 1 wherein the pollucite is selected from the group consisting of naturally occurring and synthetic pollucite and mixtures thereof.

3. The composition of claim 2 wherein the pollucite has the mole formula $$(0.05\ to\ 1\ Cs_2O) \cdot (1.90/n\ to\ 0 M^n O_{n/2}) \cdot Al_2O_3 \cdot 4\ SiO_2$$

and M represents $H^+$ and metal cations, n represents the valence charge on metal cations, and wherein the combined $Na_2O$ and $Li_2O$ mole content is below about 0.5.

4. The composition of claim 1 wherein the additive is naturally occurring pollucite.

5. The composition of claim 1 which contains from about 1 to 50 weight percent pollucite.

6. The composition of claim 1 which contains from about 5 to 60 weight percent of a molecular sieve/zeolite selected from the group comprising synthetic faujasite, ZSM, Beta SAPO, ALPO and mixtures thereof.

7. The composition of claim 3 wherein the zeolite is ultrastable Y zeolite.

8. The composition of claim 1 wherein the matrix comprises silica, alumina, silica-alumina phosphorus-alumina sols and gels, clay and mixtures thereof.

9. The composition of claim 1 wherein the catalyst is a fluid catalytic cracking catalyst having a particle size of 20 to 150 μm and a Davison attrition index of 0 to 30 DI.

* * * * *